(12) United States Patent
Takakura

(10) Patent No.: US 6,421,083 B1
(45) Date of Patent: *Jul. 16, 2002

(54) COLOR IMAGING DEVICE AND METHOD

(75) Inventor: Masayuki Takakura, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,160

(22) Filed: Mar. 25, 1997

(30) Foreign Application Priority Data

Mar. 29, 1996 (JP) .............................. 8-077998
Sep. 3, 1996 (JP) .............................. 8-233334
Feb. 28, 1997 (JP) .............................. 9-046665
Feb. 28, 1997 (JP) .............................. 9-046669

(51) Int. Cl.⁷ ............................ H04N 9/73; H04N 5/222
(52) U.S. Cl. ................................ 348/223; 348/333.02
(58) Field of Search ............................ 348/222, 223, 348/224, 225, 226, 227, 228, 229, 254, 255, 256, 273, 280, 187, 188, 655, 333, 563, 564, 569; 358/519, 515

(56) References Cited

U.S. PATENT DOCUMENTS

| | | | | |
|---|---|---|---|---|
| 4,575,124 A | * | 3/1986 | Morrison | 283/115 |
| 4,774,564 A | * | 9/1988 | Konishi | 348/224 |
| 5,155,586 A | * | 10/1992 | Levy et al. | 348/223 |
| 5,221,963 A | * | 6/1993 | Hashimoto et al. | 348/234 |
| 5,282,022 A | * | 1/1994 | Haruki et al. | 348/223 |
| 5,379,069 A | * | 1/1995 | Tani | 348/333 |

FOREIGN PATENT DOCUMENTS

| | | |
|---|---|---|
| JP | 01-143592 | 6/1989 |
| JP | 05-91311 | 4/1993 |
| JP | 07-170526 | 7/1995 |
| JP | 07-231422 | 8/1995 |
| JP | 07-231455 | 8/1995 |
| JP | 07-240929 | 9/1995 |

* cited by examiner

*Primary Examiner*—Wendy R Garber
*Assistant Examiner*—Luong Nguyen
(74) *Attorney, Agent, or Firm*—Frommer Lawrence & Haug LLP; William S. Frommer; Glenn F. Savit

(57) ABSTRACT

A color imaging method for adjusting color balance of an imaged picture of an object, which object is imaged by a camera head 3 for generating color imaging signals composed of plural color signals. Based on the relative relation between signal levels of the color signals, level balance control data are generated by an information processing device 5. The level balance control data, generated by the information processing device 5, is stored in LUTs 45R, 45G and 45B, in association with the signal level of plural color signals in each of plural light exposure volumes adjusted by the light stop of an imaging lens 2 adapted for adjusting the light exposure volume of the camera head 3 or the signal charge accumulating time of a CCD image sensor 21. Based on the signal levels of the color signals, the level balance control data associated with the color signals are read out from the LUTs 45R, 45G and 45B for controlling the signal levels of the color signals. The color balance can be adjusted even in a grey area intermediate between the black and the white which has not been possible to achieve with the conventional white balance adjustment.

2 Claims, 15 Drawing Sheets

COLOR IMAGING DEVICE AND METHOD

BACKGROUND OF THE INVENTION

1. Field of the Invention

This invention relates to a color imaging device and method for adjusting color balance of an imaged still picture.

2. Description of the Related Art

In a camera device, pre-set color reproducibility is achieved by effecting white balance adjustment and black balance adjustment, even though the color temperature of an object differs from one light source to another.

In effecting white balance adjustment, a white object is imaged, and level adjustment is performed so that the signal levels of color signals in the white luminance point will be equal to one another. In effecting black balance adjustment, the black level of imaging signals is sampled by closing a lens shutter once, and adjusting the signal level so that the black levels of the respective color signals will be equal to one another.

SUMMARY OF THE INVENTION

It is therefore an object of the present invention to provide a color imaging device and a color imaging method whereby it is possible to effect color balance in a grey area intermediate between the black and white which has not been possible with conventional white balance adjustment.

It is another object of the present invention to provide a color imaging device and a color imaging method whereby it is possible to perform color balance adjustment in all grey areas including the black and white.

In one aspect, the present invention provides a color imaging apparatus including imaging means for imaging an object for generating a color imaging signal made up of a plurality of color signals, level balance control data generating means for generating level balance control data based on the relative relation between signal levels of the color signals, light exposure volume adjustment means for adjusting the light exposure volume of the imaging means, memory means for storing, in each light exposure volume adjusted by the light exposure adjustment means, the level balance control data generated by the level balance control data generating means, in association with signal levels of the color signals in each light exposure volume, and level balance control means for reading out the level balance control data associated with the color signals from the storage means, based on the signal level of each of the color signals, for controlling the signal level of each color signal. This enables color balance adjustment in a entire grey area between black and white which has not been possible to perform in conventional white balance adjustment.

In another aspect, the present invention provides a color imaging apparatus including imaging means for imaging an object for generating a color imaging signal made up of a plurality of color signals, pre-set area extraction means for sequentially extracting color imaging signals of portions representing images in a plurality of pre-set areas in a picture represented by the color imaging signals, level balance control data generating means for generating level balance control data based on the relative relation between signal levels of the color signals contained in the pre-set areas, storage means for storing the level balance control data in association with the relative relation of the signal levels of the color signals contained in the preset areas, and level balance control means for reading out the level balance control data from the storage means in association with the color signals based on the signal levels of the color signals for controlling the signal levels of the color signals. This enables automatic color balance adjustment in a entire grey area between black and white.

In still another aspect, the present invention provides a color imaging apparatus including imaging means for imaging an object for generating color imaging signals made up of a plurality of color signals, display means for displaying an image based on the color imaging signals, area designation means for designating a desired area in the image displayed by the display means, level balance control data generating means for generating level balance control data based on the relative relation between signal levels of the color signals constituting the color imaging signals corresponding to the area designated by the area designating means, storage means for storing the level balance control data in association with the signal levels of the color signals in the area designated by the area designating means, and level balance control means for reading out the level balance control data associated with respective color signals from the storage means based on the signal levels of the color signals for controlling the signal levels of the color signals. This enables color balance adjustment in a entire grey area between black and white by a simplified operation. BRIEF DESCRIPTION OF THE DRAWINGS FIG. 1 is a schematic block diagram showing the configuration of an imaging system embodying the present invention.

Figure 6:
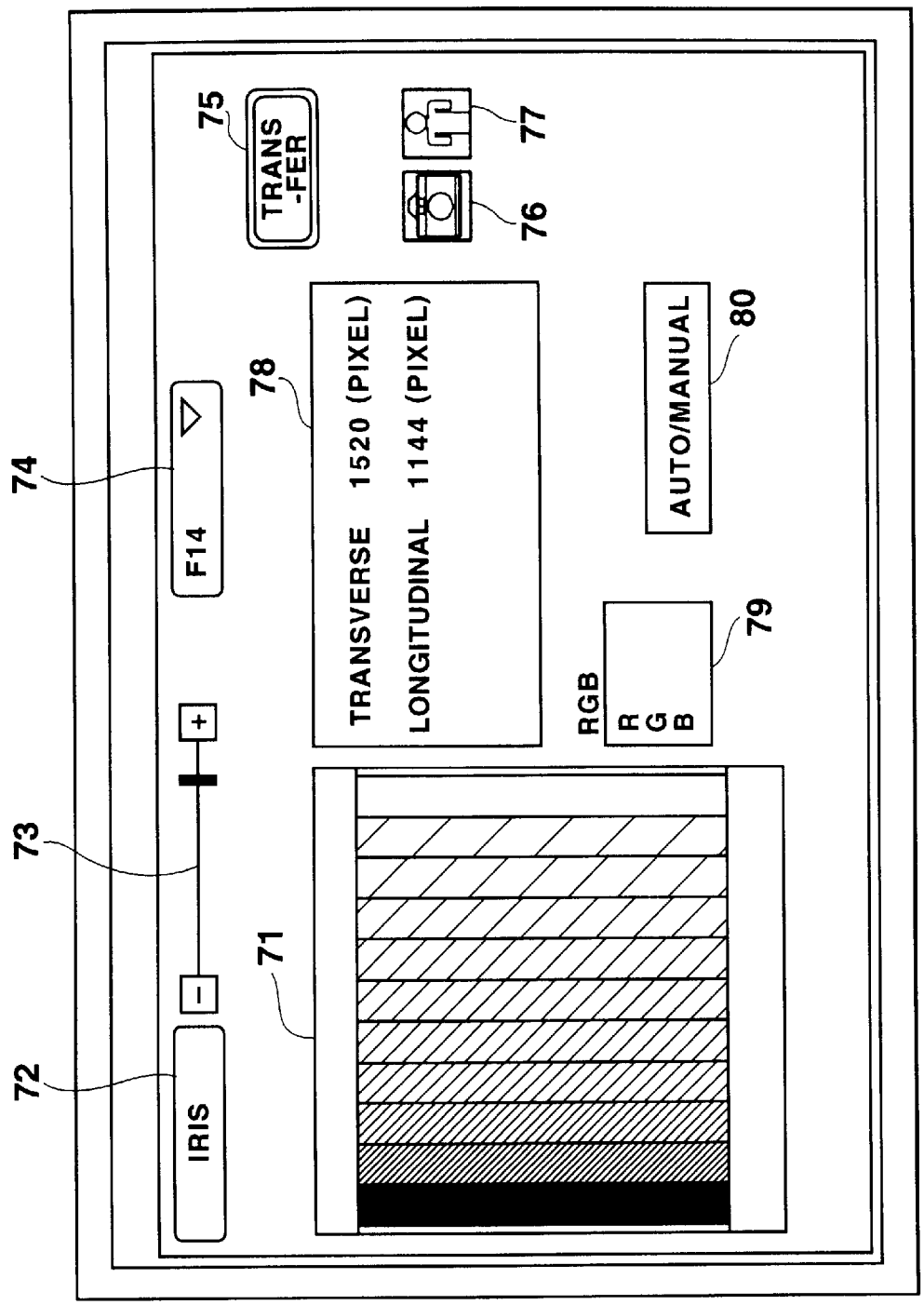
FIG. 6 illustrates the display contents of a display of an information processing apparatus in the imaging system of FIG. 2.
Figure 11:
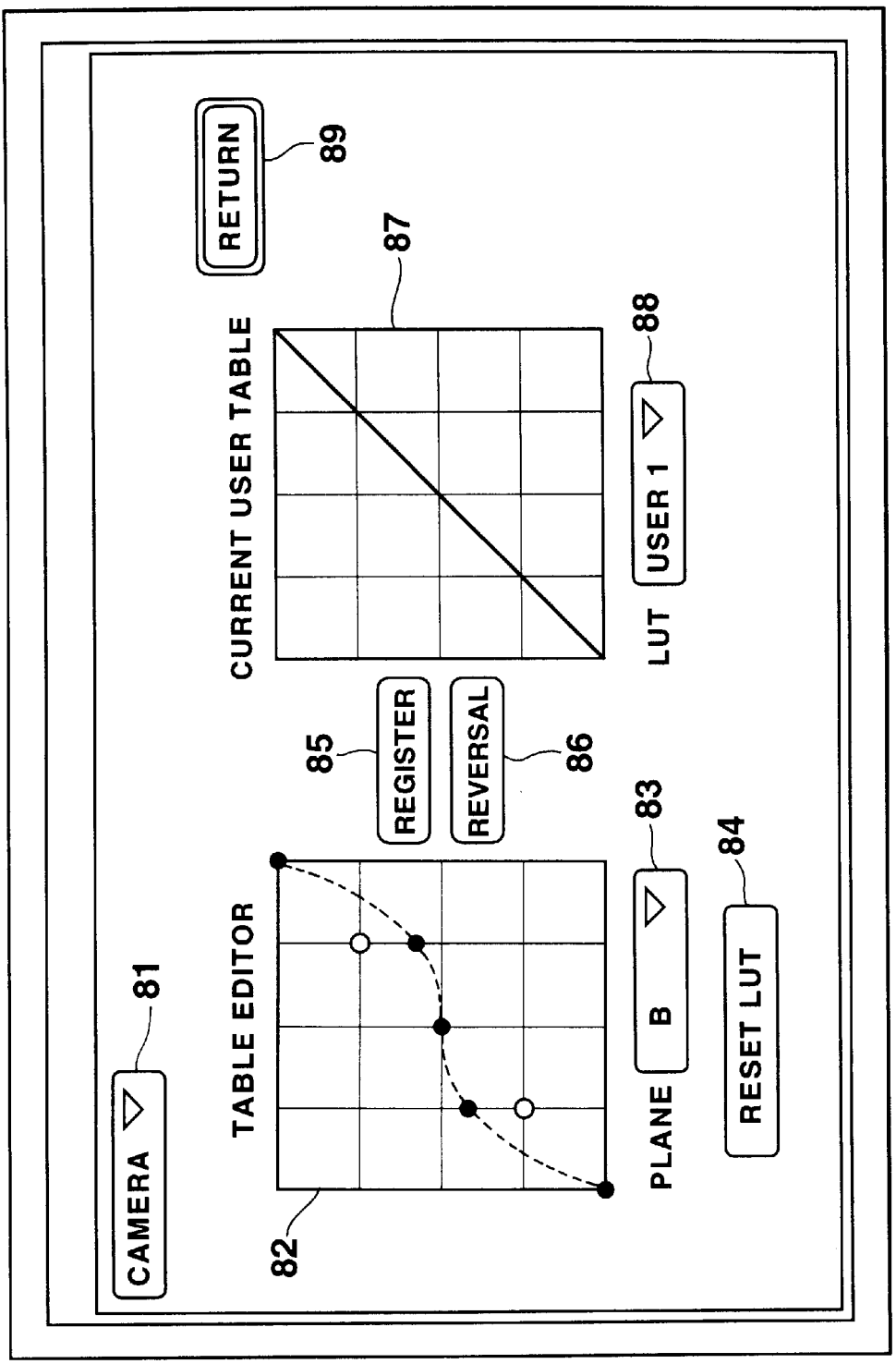

FIG. 11 similarly illustrates the display contents of the display of the information processing apparatus shown in FIG. 6.

Figure 1:
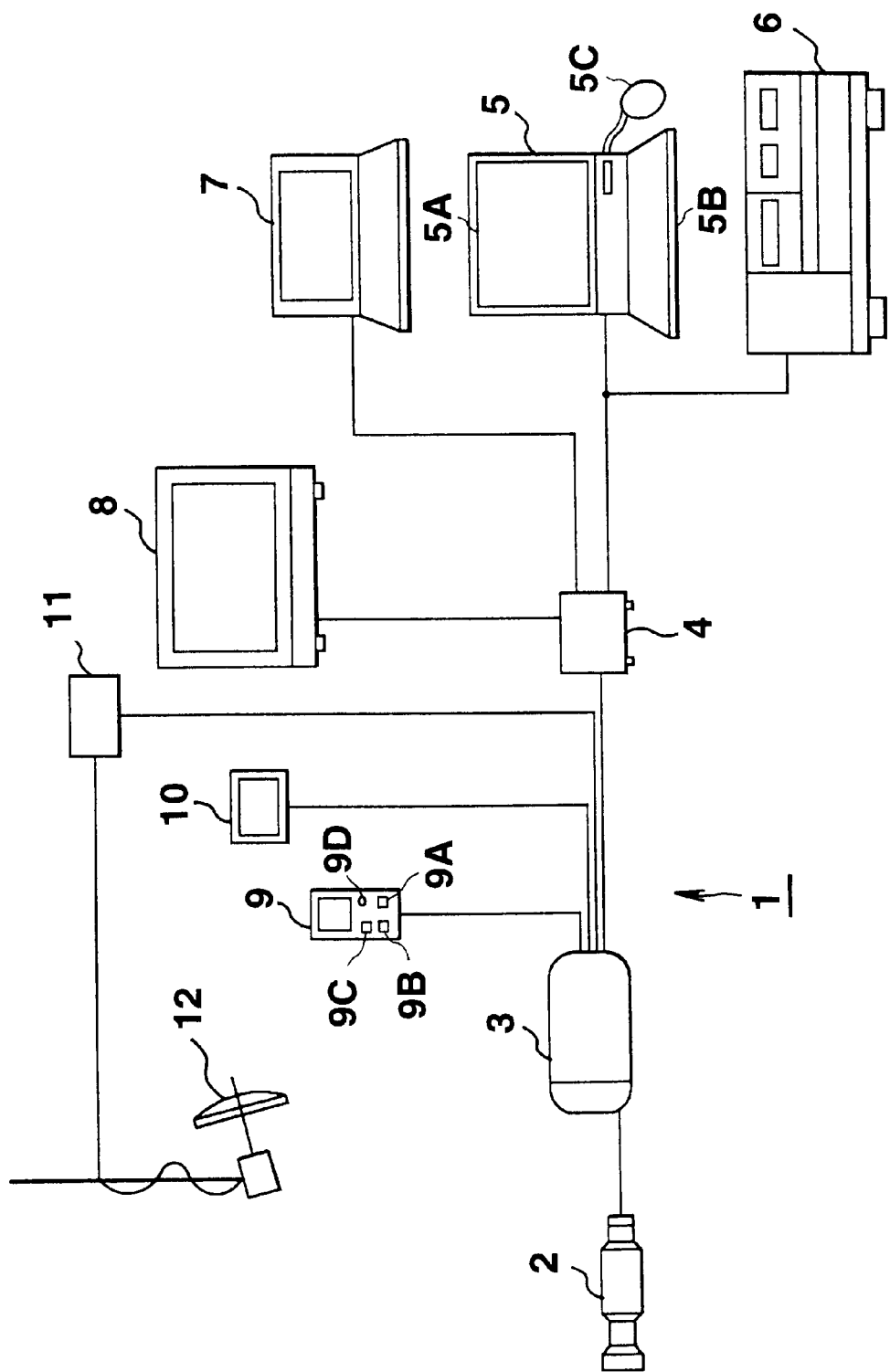
Figure 2:
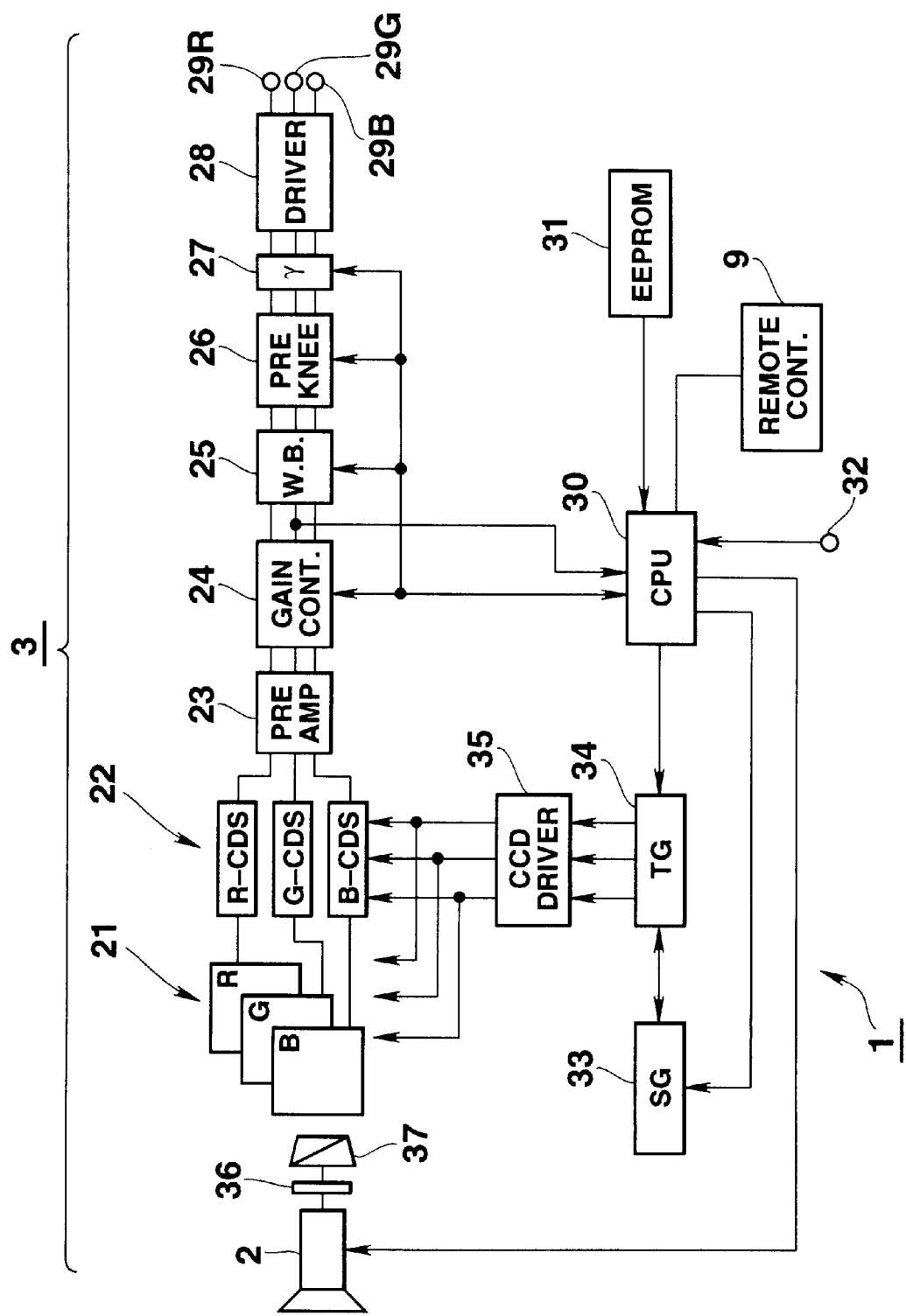
FIG. 2 is a block diagram showing an illustrative structure of a color imaging device in the imaging system of FIG. 1.
Figure 12:
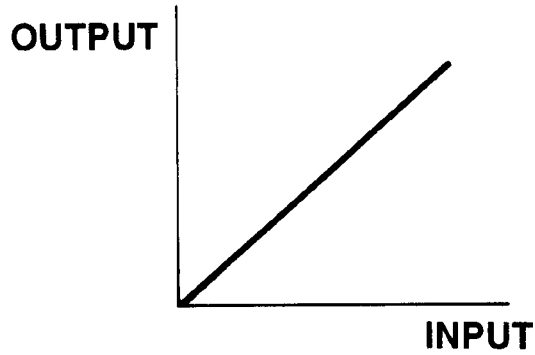

FIG. 12 is a graph showing characteristics of the usual LUT in the imaging system of FIG. 2.

Figure 13:
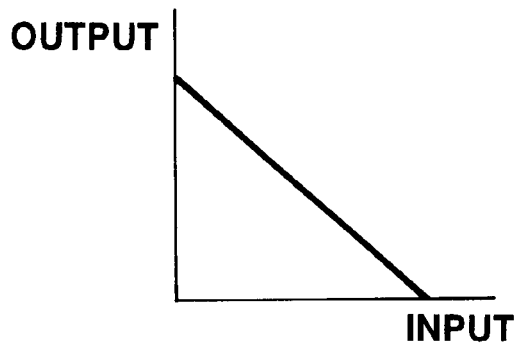

FIG. 13 is a graph showing characteristics of the LUT with negative-positive inversion in the imaging system of FIG. 2.

Figure 14:
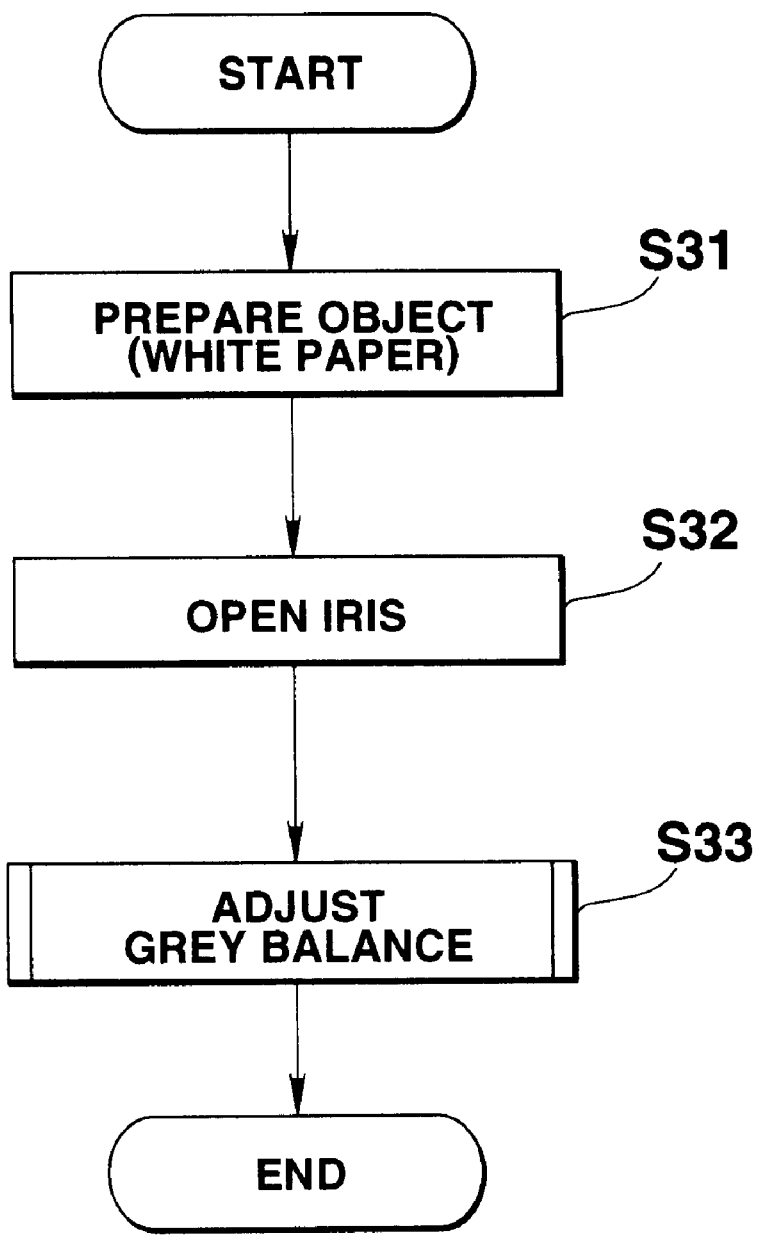

FIG. 14 is a flowchart showing another method for adjustment of the color balance in the imaging system of FIG. 2.

Figure 15:
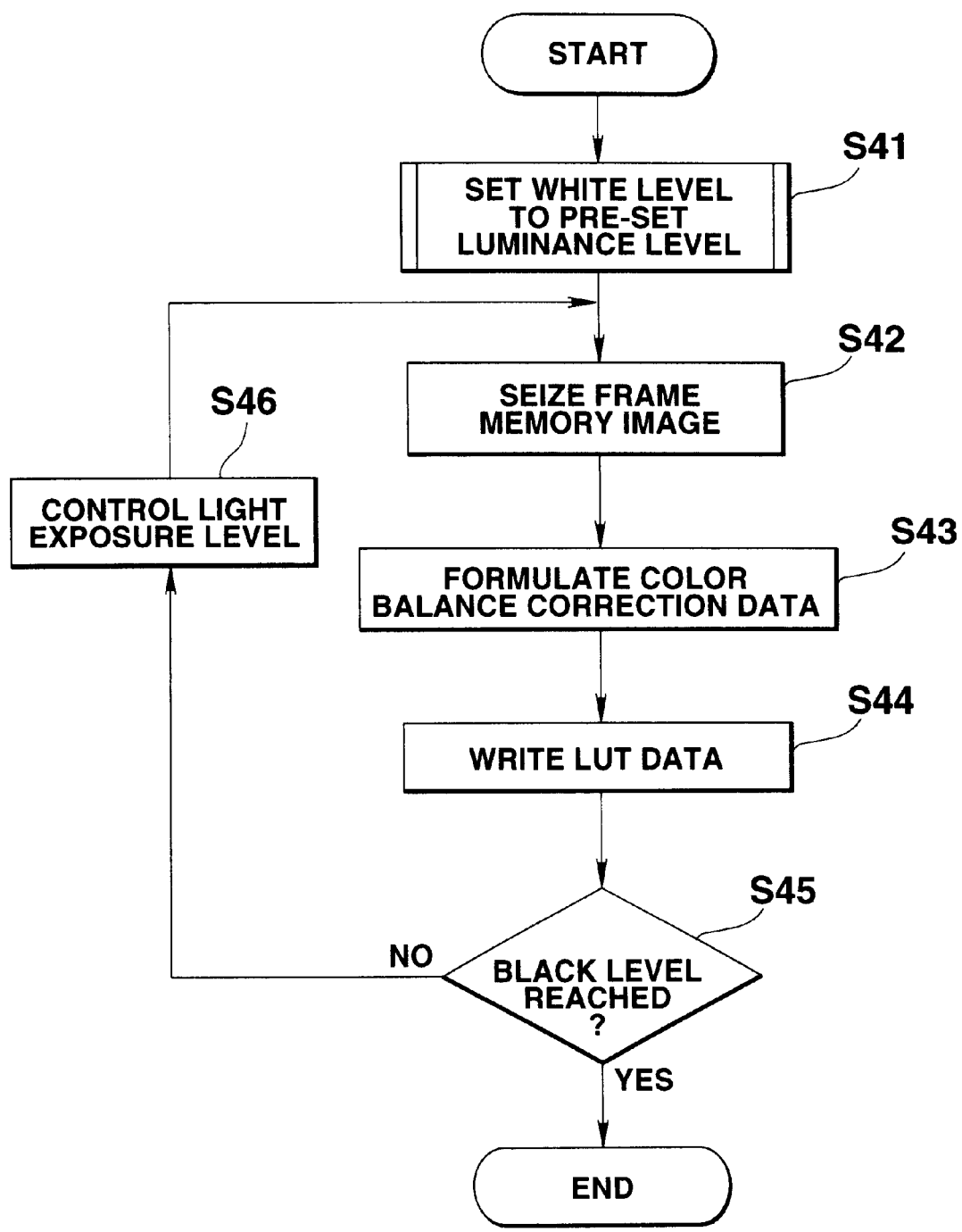

FIG. 15 is a flowchart for illustrating the sequence of formulating color balance correction data.

Figure 16:
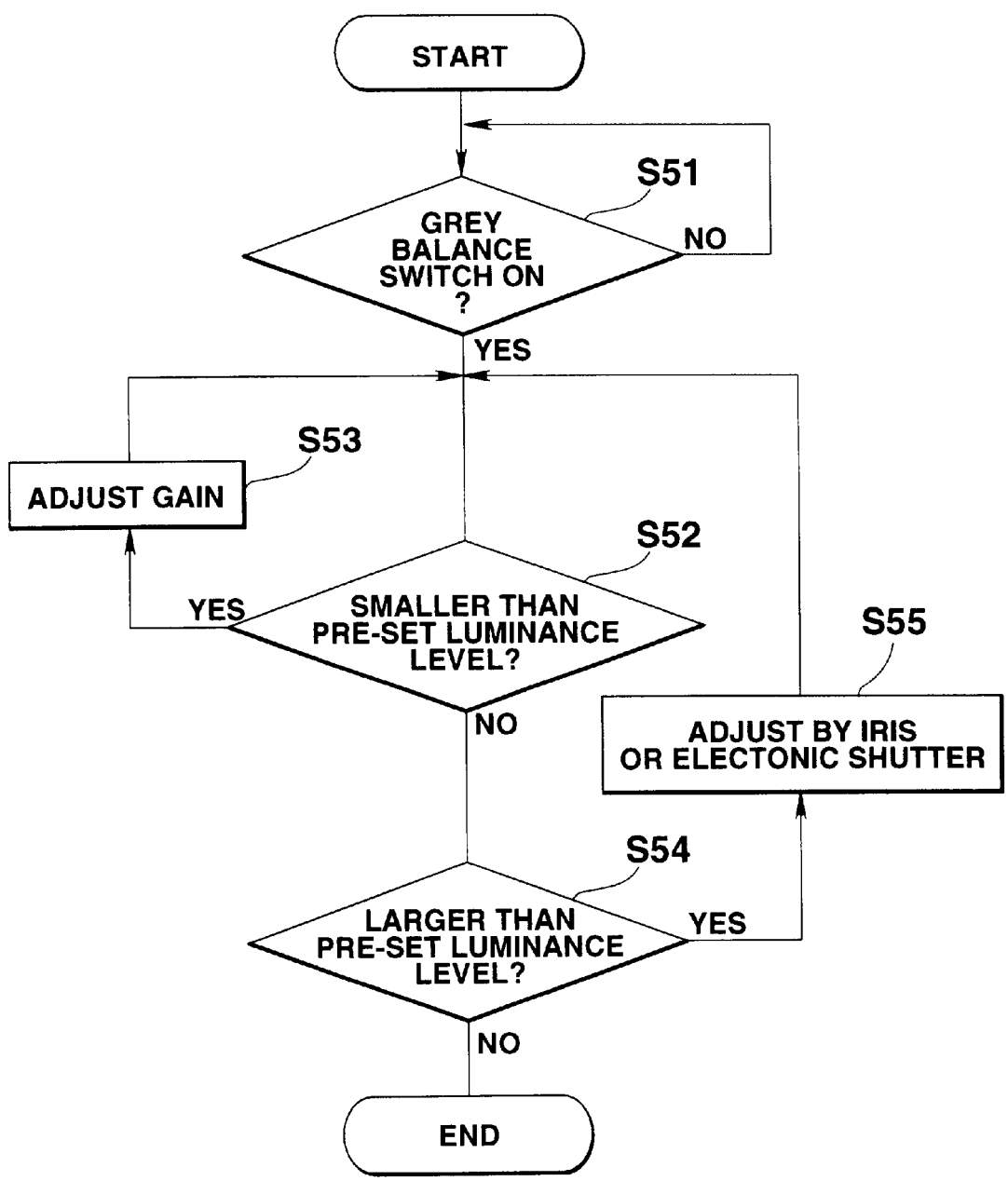

FIG. 16 is a flowchart for illustrating the sequence of white luminance level setting.

DESCRIPTION OF THE PREFERRED EMBODIMENTS

Referring to the drawings, preferred embodiments of the present invention will be explained in detail. The present imaging system has the function of performing fine adjustment in white balance adjustment (grey balance adjustment) at the time of fine gamma adjustment for color imaging signals of red (R), green (G) and blue (B) obtained on imaging an object by a color imaging device 1 for effecting level balance adjustment for color signals for all intermediate colors from white to black.

The color imaging device 1 of the present imaging system includes a camera head 3 for imaging an object via an imaging lens 2 for outputting imaging signals, and a digital processor 4 for converting the color imaging signals from the camera head 3, storing the converted imaging data, supplying the stored picture data to an information processing device 5 and for effecting color signal level balance adjustment for the stored imaging data.

The imaging system also includes an information processing device 5 for controlling data processing by the digital processor 4, a printer 6 for outputting an image of the object based on the imaging data transmitted from the color imaging device 1. The imaging system further includes a personal computer 7 for performing a control similar to that performed by the information processing device 5 and a monitoring device 8 for displaying an image of the object imaged by the camera head 3.

The imaging system also includes a remote controller 9 for performing flash synchronized imaging, and a liquid crystal display (LCD) view finder 10 for displaying the image of the object imaged by the camera head 3. The imaging system also includes a strobo generator 11 and a strobo light emitting device 12 which emits flash light if, in case of necessity, a release button 9A of the remote controller 9 is pressed.

Specifically, the camera head 3 includes a charge coupled device (CCD) image sensor 21, a correlated double sampling (CDS) circuit 22, a pre-amplifier 23, a gain control circuit 24, a white balance circuit 25, a pre-knee circuit 26, a gamma correction circuit 27 and an output driver 28, as shown for example in FIG. 2.

The CCD image sensor 21 is of a progressive scan type three CCD plate system designed for reading out color imaging signals of red (R), green (G) and blue (B) responsive to three prime color components separated by a color separation prism 37 from the imaging light incident thereon from the imaging lens 2 via an optical low-pass filter 36.

The CDS circuit 22 performs correlated double sampling on the color imaging signals R, G and B read out from the CCD image sensor 21 to send color imaging signals R, G and B, reduced in random noise, to the pre-amplifier circuit 23.

Each of the color imaging signals of R, G and B, amplified by the pre-amplifier circuit 23, has its gain controlled by the gain control circuit 24 controlled by the CPU 30. The gain-controlled color imaging signals are routed to the white balance circuit 25.

The white balance circuit 25 performs white clip on the color imaging signals, if need be, and routes the processed color imaging signals R, G and B to the pre-knee circuit 26.

The pre-knee circuit 26 compresses the signal level of the color imaging signals R, G and B higher than a pre-set knee level and routes the compressed signals to the gamma correction circuit 27. This gamma correction circuit 27 performs signal level conversion based on, for example, a 0.45 γ non-linear curve in order to route the color imaging signals R, G and B via output driver 28 and terminals 29R, 29G and 29B to the digital processor 4.

The camera head 3 includes a micro-computer (CPU) 30 for controlling the gain control circuit 24, white balance circuit 25, pre-knee circuit 26 and the gamma correction circuit 27, an electrically erasable programmable ROM (EEPROM) 31 for holding in memory a control program for the CPU 30, and a sync generator 33 for generating synchronization signals. The camera head 3 also includes a timing generator 34 for generating CCD readout pulses based on the synchronization signals from the sync generator 33 and a CCD driver 35 for amplifying CCD readout pulses from the timing generator 34.

The CPU 30 controls gamma correction, generation of synchronization signals by the sync generator 33 or the diaphragm of the imaging lens 2 based on the control signals supplied from the digital processor 4 via terminal 32 and the control program stored in the EEPROM 31.

The sync generator 33 generates vertical and horizontal synchronization signals and routes these synchronization signals to the timing generator 34. The timing generator 34 generates CCD readout pulses, vertical transfer pulses and horizontal transfer pulses based on these synchronization signals. The CCD driver 35 drives the CCD image sensor 21 by these CCD readout pulses. The CCD image sensor 21 thus outputs color imaging signals R, G and B at a rate of 24 frames per second.

Figure 3:
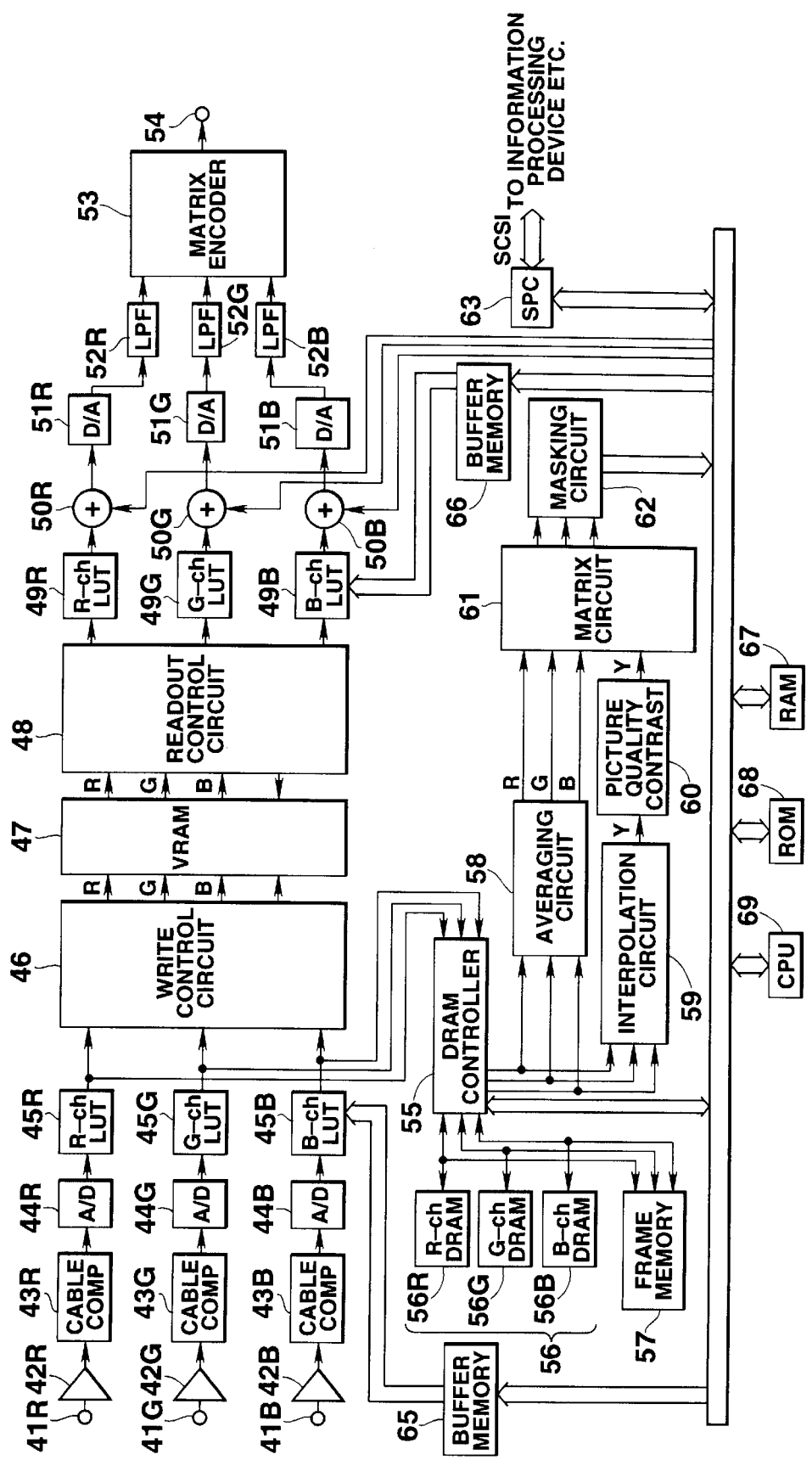
FIG. 3 is a schematic block diagram showing an illustrative .configuration of a digital processor of the color imaging device shown in FIG. 2.

Referring to FIG. 3, the digital processor 4 includes amplifiers 42R, 42G and 42B for amplifying the color imaging signals R, G and B supplied from the camera head 3 and cable compensators 43R, 43G and 43B for compensating the cable length for the color imaging signals from the amplifiers 42R, 42G and 42B. The digital processor 4 also includes analog/digital (A/D) converters 44R, 44G and 44B for converting the color imaging signals R, G and B from the cable compensators 43R, 43G and 43B and lookup tables (LUTs) 45R, 45G and 45B for converting the gradation of the color imaging data from the A/D converters 44R, 44G and 44B.

The cable compensators 42R, 42G and 42B are fed with color 6E imaging signals R, G and B from the camera head 3 via terminals 41R, 41G and 41B and amplify these color imaging signals R, G and B to supply the amplified signals to the cable compensators 43R, 43G and 43B.

The cable compensators 43R, 43G and 43B compensate for deterioration in frequency characteristics responsive to the cable length for the amplified color imaging signals and route the respective produced color imaging signals to the A/D converters 44R, 44G and 44B.

The A/D converters 44R, 44G and 44B convert the color imaging signals into color imaging data composed of 10-bit samples, using sampling clocks, not shown, based on the synchronization signals from the camera head 3, and route the color imaging data to the LUTs 45R, 45G and 45B.

Figure 4:
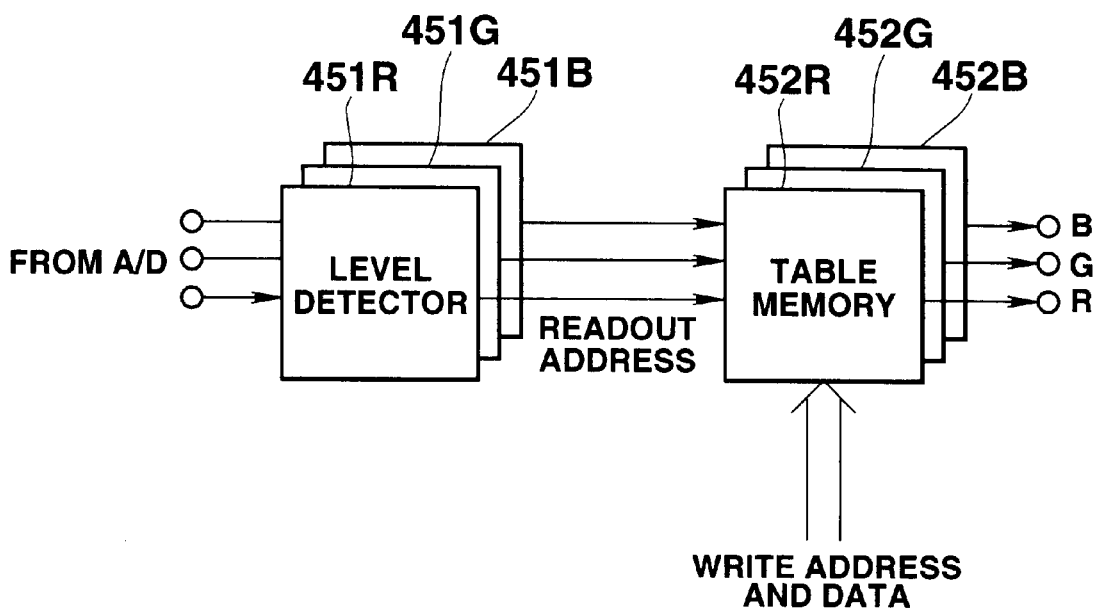
FIG. 4 is a block diagram showing the configuration of a LUT provided in the digital processor of FIG. 3.
Figure 5:
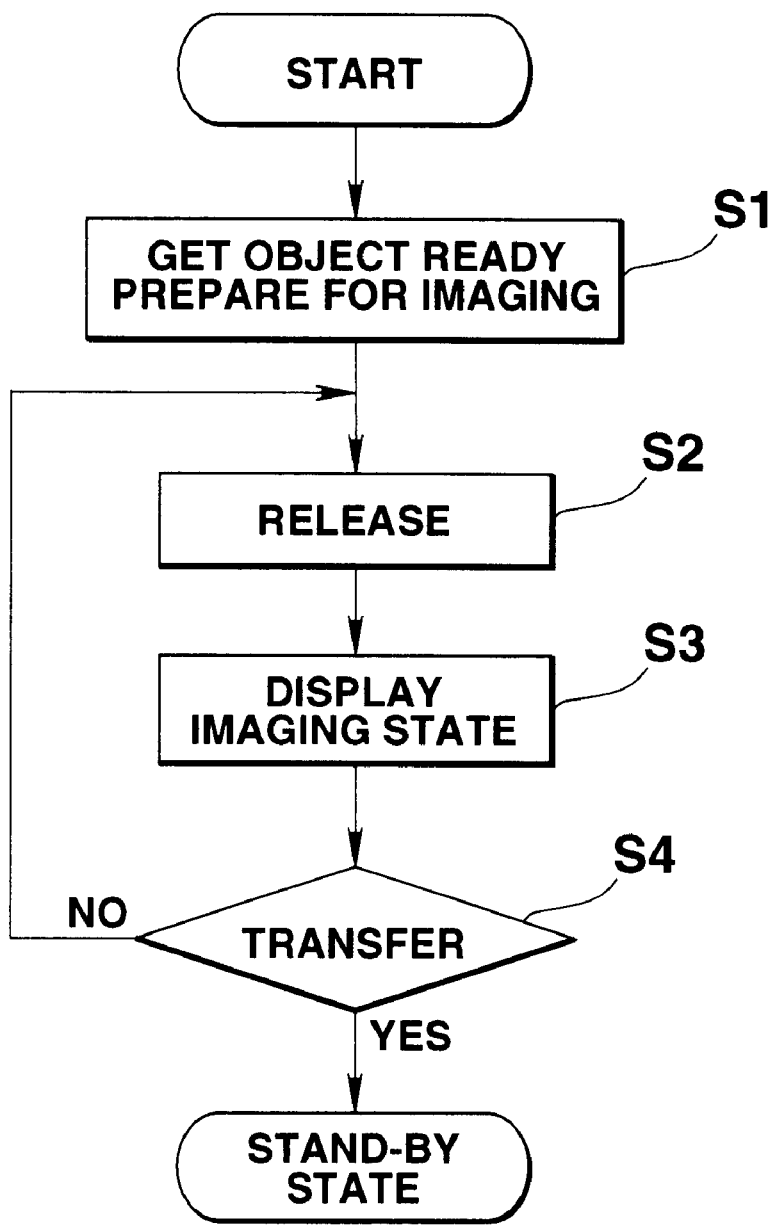
FIG. 5 is a flowchart showing the method for adjusting the color balance in the imaging system of FIG. 2.

The LUTs 45R, 45G and 45B store level conversion data as table data in order to perform grey balance correction of color imaging data gamma-corrected by the gamma correction circuit 27. The LUTs 45R, 45G and 45B are made up of level detectors 451R, 451G and 451B fed with 10-bit color imaging data from the A/D converters 44R, 44G and 44B and table memories 452R, 452G and 452B, from which table data are read, using the detection outputs by the level detectors 451R, 451G and 451B as readout addresses, as shown in FIG. 4. As the table memories 452R, 452G and 452B, a 512K 8 bit static random access memory (SRAM) is used for each of the table memories 452R, 452G and 452B. In this SRAM is stored, as table data, 8-bit level conversion data supplied from a random access memory (RAM) 67 via a buffer memory 65.

The LUTs 45R, 45G and 45B convert the 10-bit color imaging data supplied from the A/D converters 44R, 44G and 44B into 8-bit color imaging data which are supplied to a write control circuit 46 and a dynamic random access memory (DRAM) controller 55.

The digital processor 4 includes a write control circuit 46 for controlling the writing of the color imaging data R, G and B from the LUTs 45R, 45G and 45B and a video random access memory (RAM) 47 for storing the color imaging data under control by the write control circuit 46. The digital processor 4 also includes a readout control circuit 48 for controlling readout of the color imaging data read out from the VRAM 47 and LUTs 49R, 49G and 49B for converting the gradation of the color imaging data read out from the readout control circuit 48. The digital processor 4 further includes converters 51R, 51G and 51B for converting the color imaging data R, G and B from the LUTs 49R, 49G and 49B into color imaging signals 51R, 51G and 51B, low-pass filters (LPFs) 52R, 52G and 52B for allowing passage only of color imaging signals of a specified band, and a matrix encoder 53.

The write control circuit 46 transmits readout clocks of 30 MHZ to the VRAM 47, while reading out color imaging data R, G and B at a rate of 30 frames per second in synchronism with the readout clocks for supplying the color imaging data to the LUTs 49R, 49G and 49B. The readout control circuit 48 routes the 30 MHZ write clocks to the VRAM 47, while reading out the color imaging data from the VRAM 47 at a rate of 30 frames per second in synchronism with the readout clocks for supplying the color imaging data R, G and B to the LUTs 49R, 49G and 49B.

The LUTs 49R, 49G and 49B are each made up of a 512K 8 bit SRAM for storing LUT data supplied from the RAM 67 via buffer memory 66. Specifically, the LUTs 49R, 49G and 49B hold in memory as table data such characteristic data in which color regeneration of the monitoring device 8 and gradation regeneration (picture quality) will be equal to the picture quality displayed on a CRT of a display of the information processing device 5 or with the picture quality of the picture printed out by the printer 6, and perform level correction of color imaging data by these characteristic data. The LUTs 49R, 49G and 49B convert the gradation of the color imaging data R, G and B independently of one another in order to route the resulting color imaging data to the D/A converters 51R, 51G and 51B, respectively.

The D/A converters 51R, 51G and 51B convert the color imaging data, made up of 8-bit samples, into color imaging signals R, G and B which are then supplied to the LPFs 52R, 52G and 52B, respectively. In the upstream stage of the D/A converters 51R, 51G and 51B are provided adders 50R, 50G and 50B supplied with menu data read out from the ROM 68 in which is pre-stored a program designed to control the overall system.

The LPFs 52R, 52G and 52B allow for passage only of a pre-set band of the color imaging signals R, G and B to eliminate unneeded band components and routes the resulting color imaging signals to the matrix encoder 53.

The matrix encoder 53 converts the color imaging signals R, G and B into, for example, luminance signals Y and chroma signals C and processes these signals Y and C into composite color video signals of, for example, the NTSC system, in order to supply the color signals via terminal 54 to the monitor device 8. The matrix encoder 53 can also output the color imaging signals R, G and B directly. This enables an image corresponding to the signals from the color imaging device to be displayed on the monitor device 8.

The digital processor 4 includes a frame memory 56, a frame memory 57, as a spare for this frame memory, and a DRAM controller 55 for writing color imaging data on the frame memories 56, 57 for reading out color imaging data from the frame memories 56, 57.

The frame memory 56 includes a DRAM 56R for storing the color imaging data R in memory, a DRAM 56G for storing the color imaging data G in memory and a DRAM 56B for storing the color imaging data B in memory. Each of the DRAMs 56R, 56G and 56B can store in memory color imaging data of, for example, 1280×960 pixels. The color imaging data R, G and B from the DRAMs 56R, 56G and 56B are read out from or written in the frame memory 56 under control by the DRAM controller 55.

The DRAM controller 55 is configured for writing the color imaging data R, G and B from the LUTs 45R, 45G and 45B in the frame memory 56, or for reading stored color imaging data from the frame memory 56. The DRAM controller 55 is configured for decimating the color imaging data stored in the frame memory 56 for reading out 640×480 pixels of color imaging data.

The frame memory 57 is configured similarly to the frame memory 56 and is provided as a spare for the frame memory 56.

The digital processor 4 includes an averaging circuit 58 for removing redundant high frequency range of the color imaging data from the DRAM controller 55, and an interpolation circuit 59 for interpolating the color imaging data from the DRAM controller 55 for outputting luminance data Y. The digital processor 4 also includes a picture quality adjustment and contrast adjustment circuit 60 for increasing the acuteness of picture quality of the luminance data Y from the interpolation circuit 59 and for adjusting the contrast, and a matrix circuit 61. The digital processor 4 further includes a masking circuit 62 for broadening the frequency width of respective color imaging data from the matrix circuit 61 and a SCSI (small computer system interface) protocol controller (SPC) 63 operating as an interface for signal transmission/reception over an SCSI bus.

The averaging circuit 58 removes unneeded high frequency band components of the color imaging data R, G and B, for preventing aliasing of the high frequency band signal components to the signal components of the low frequency band and routes the color imaging data R, G and B to the matrix circuit 61.

The interpolation circuit 59 interpolates the color imaging data for improving resolution and converts the interpolated color imaging data R, G and B into image data Y. U and V. The interpolation circuit 59 also transmits the luminance data Y to the picture quality adjustment and contrast adjustment circuit 60, while routing the chroma data U and V to the matrix circuit 61.

The picture quality adjustment and contrast adjustment circuit 60 acquires contour signals by a high-pass filter from, for example, luminance data Y, and removes the noise contained in the contour signals by a core ring. After amplitude adjustment, the circuit 60 sums the resulting signal to the main signal for adjusting the picture quality. The picture quality adjustment and contrast adjustment circuit 60 varies the gain of the luminance data Y and moderately varies the amplitude for contrast adjustment. The contrast-adjusted luminance data Y is fed to the matrix circuit 61.

The matrix circuit 61 can output one of the supplied color imaging data R, G and B and picture data Y, U and V. For example, the matrix circuit 61 outputs the color imaging data R, G and B to the masking circuit 62.

The masking circuit 62 widens the band of the supplied color imaging data R, G and B for increasing the saturation for enhancing flashiness of the colors. In addition, the masking circuit 62 transmits the resulting color imaging data R, G and B via SPC 63 to, for example, the information processing device 5.

The digital processor 4 includes a buffer memory 65 for writing level conversion data in the LUTs 45R, 45G and 45B and a buffer memory 66 for writing level conversion data in the LUTs 49R, 49G and 49B. The digital processor 4 also includes a RAM 67 for holding in memory the data of the LUTs 45 and 49, a ROM 68 in which a program for controlling the overall system is stored, and a CPU 69 for executing the program written in the ROM 68.

With the above-described imaging system, a picture corresponding to the object is displayed on the monitor device 8. If the user presses a release button 9A as he or she views the monitor device 8, the color imaging data is stored in the frame memory 56. The color imaging data stored in the frame memory 56 is transferred over an SCSI bus to the information processing device 5 which can perform color balance adjustment thereon. The printer 6 is adapted for printing out a still picture based on the color imaging data.

Specifically, with the present imaging system, the user prepares the object at step Si and adjusts the focusing or the angle of field as he or she views a moving picture displayed on the viewfinder 10 or on the monitor device 8, while checking the light stop value. On the other hand, menu data is read out from the ROM 68 in which the program for controlling the overall system is read out and sent to the adders 50R, 50G and 50B, so that the user can actuate a button of the remote controller 9 for setting the imaging conditions as he or she views the menu representation, not shown, of the camera sensitivity or the light exposure system.

With the present imaging system, the user presses at step S2 the release button 9A of the remote controller 9 for supplying a release signal to the CPU 30 of the camera head 3 for imaging an object. The imaging signals produced by the camera head 3 are fed to the digital processor 4 which then writes the color imaging signal converted by the digital processor 4 into digital signals via DRAM controller 55 in the frame memory 56.

In the next step S3, the color imaging data written in the frame memory 56 are read out and imaging signals are supplied to the monitor device 8 from the matrix encoder 53 via terminal 54. The user views an image displayed on the monitor device 8 and transfers the image to the information processing device 5.

At the next step 4, the user clicks a 'transfer' button 9C on the remote controller 9 or a 'transfer' button 75 on a display screen of the information processing device 5. This routes the transfer command signal to the CPU 30 of the camera head 3. The transfer command signal is sent via terminal 32 to the CPU 69 of the digital processor 4. Under control by the CPU 69, the DRAM controller 55 decimates and reads out color imaging data stored in the frame memory 56. For example, 1280×960 pixel color imaging data have been written in the DRAMs 56R, 56G and 56B of the frame memory 56. These color imaging data R, G and B are decimated by the DRAM controller 555 reading out 640× 960 pixel color imaging data. The read-out color imaging data R, G and B are directly outputted by the matrix circuit 61 so as to be transferred via masking circuit 62 and SPC 63 to the information processing device 5.

When the color imaging data R, G and B have been transferred from the digital processor 4 to the information processing device 5, the device 5 is in a stand-by state in readiness for auto/manual selection setting, with the picture derived from these color imaging data R, G and B being displayed on the display 5A.

That is, the present imaging system is configured for adjusting color balance of the color imaging data R, G and B based on the color balance adjustment control from the information processing device 5.

The color balance adjustment by the information processing device 5 is classified into standard object correction of doing color balance adjustment at an optional intermediate level from black to white, and general object correction of doing color balance adjustment at an optional point of an image being formed.

In the case of the standard object correction, a grey scale is imaged by the camera head 3. At this time, there are displayed, on the display 5A of the information processing device 5, a display portion 71 displaying the grey scale consisting of 11 areas gradually changed from black to white, an iris registration portion 72, having registered therein pre-set values of iris of the imaging lens 2, an iris adjustment portion 73, an iris setting portion 74, an adjustment data transfer portion 75 for transferring adjustment data to the color imaging device 1 after color balance adjustment, a release portion 76, a level/memory selection portion 77 for switching between a level image and a stored image, a coordinate display portion 78 for displaying the coordinate of a side of the display portion 71 pointed by a mouse 5C, a level display portion 79 for displaying level values of the color signals R, G and B, and an auto-manual selection portion 80 for selecting whether color balance adjustment is to be performed automatically or manually, as shown for example in FIG. 6.

Figure 7:
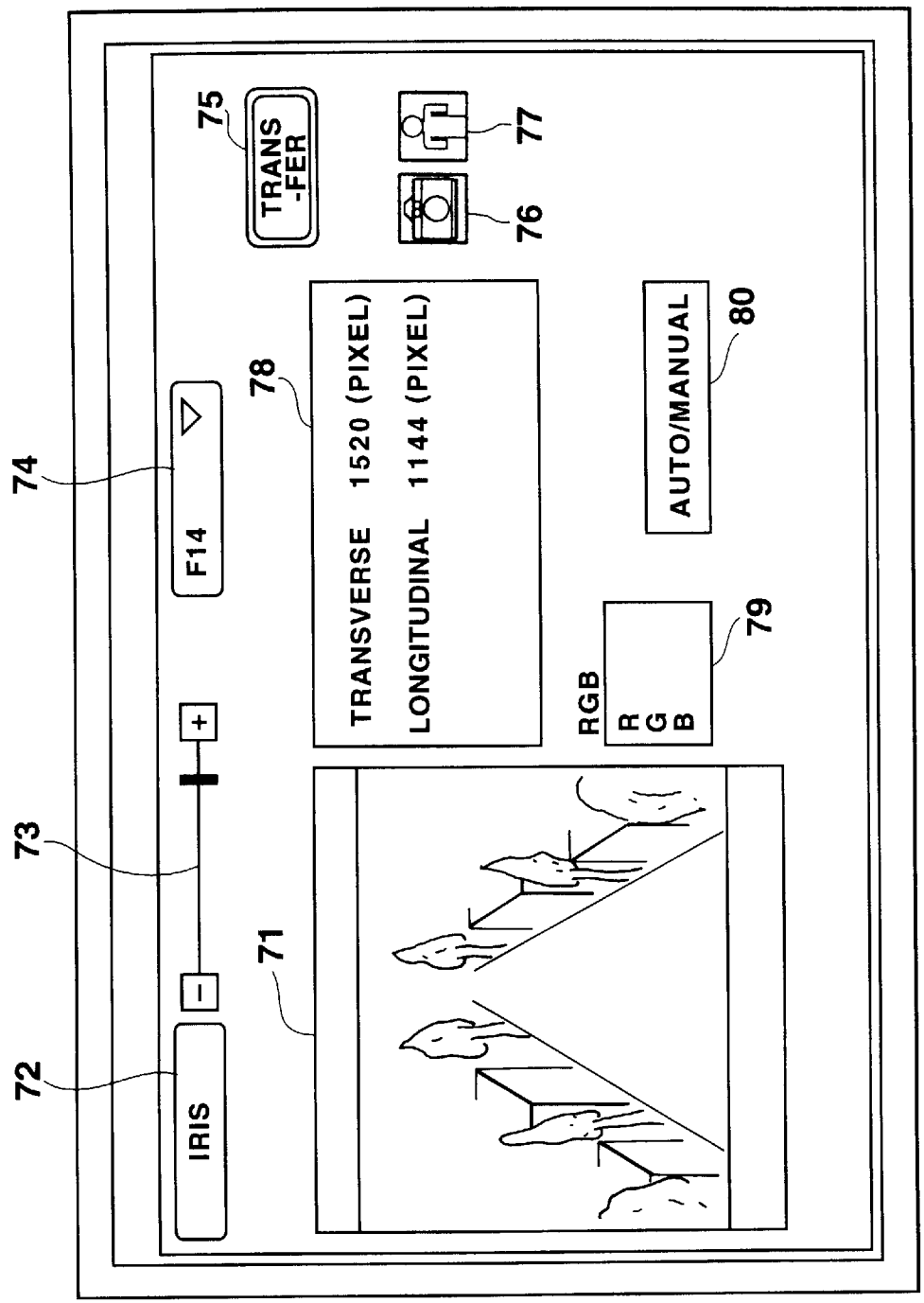
FIG. 7 illustrates the display contents of a display of the information processing apparatus shown in FIG. 6.

In the case of general object correction, a decimated object image is displayed on the display portion 71, as shown for example in FIG. 7. Switching between the standard object correction and the general object correction may be achieved using, for example, the remote controller 9.

The user can designate a point of a picture displayed on the display portion 71 of the display 5A using, for example, the mouse 5C, as shown for example in FIG. 6.

In the standard object correction, if the user clicks an optional point of the display portion 71 to designate the grey level for grey balance adjustment, the information processing device 5 can display respective signal levels of the color imaging signals R, G and B at the designated positions on the level display portion in terms of values from Oh to FFh.

Similarly, in the general object correction, if the user clicks an optional point of the display portion 71 to designate the grey level for grey balance adjustment, the information processing device 5 can display respective signal levels of the color imaging signals R, G and B at the designated positions on the level display portion in terms of values from Oh to FFh.

If the user clicks a mark in the iris registration portion 72, a previously registered iris value is displayed. If the user re-clicks a desired one of the registered iris values, the information processing device 5 transmits data of the clicked iris values to the CPU 30 of the camera head 3 for adjusting the iris of the imaging lens 2. The user may similarly drag a short crossbar of the iris adjustment portion 73 towards the left or right for doing iris adjustment.

Figure 8:
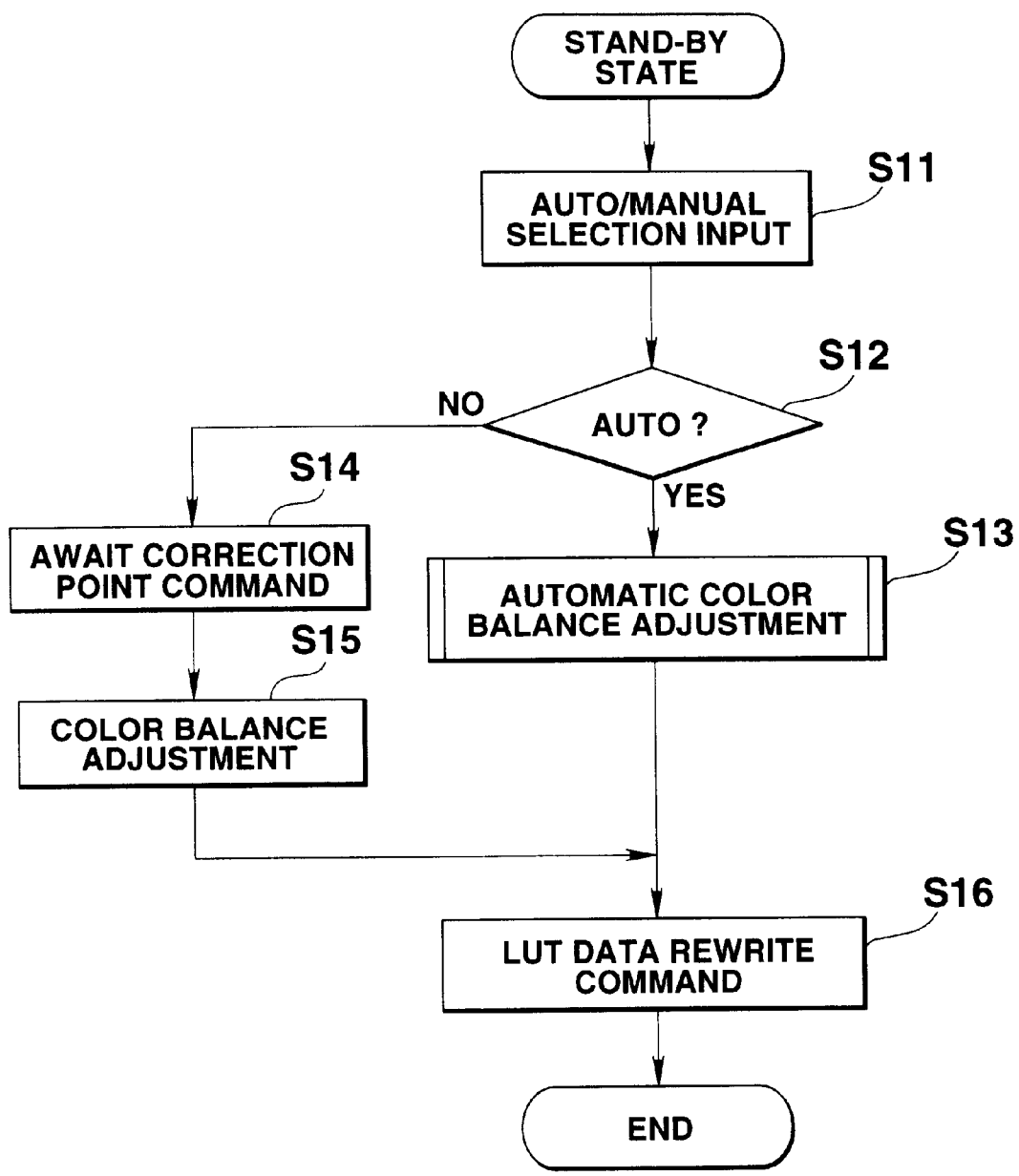
FIG. 8 is a flowchart showing the sequence of automatic adjustment of color balance in the imaging system of FIG. 2.

Referring to the flowchart of FIG. 8, if, in the above-mentioned stand-by state, the user clicks the auto/manual selection portion 80 at step S11, the information processing device 5 proceeds to step S12 in order to judge whether or not auto has been selected.

If auto is selected, the information processing device 5 transfers to step S13 for doing automatic grey balance adjustment. Conversely, if manual is selected, the information processing device 5 transfers to step S14 to await designation of the correction point.

Figure 9:
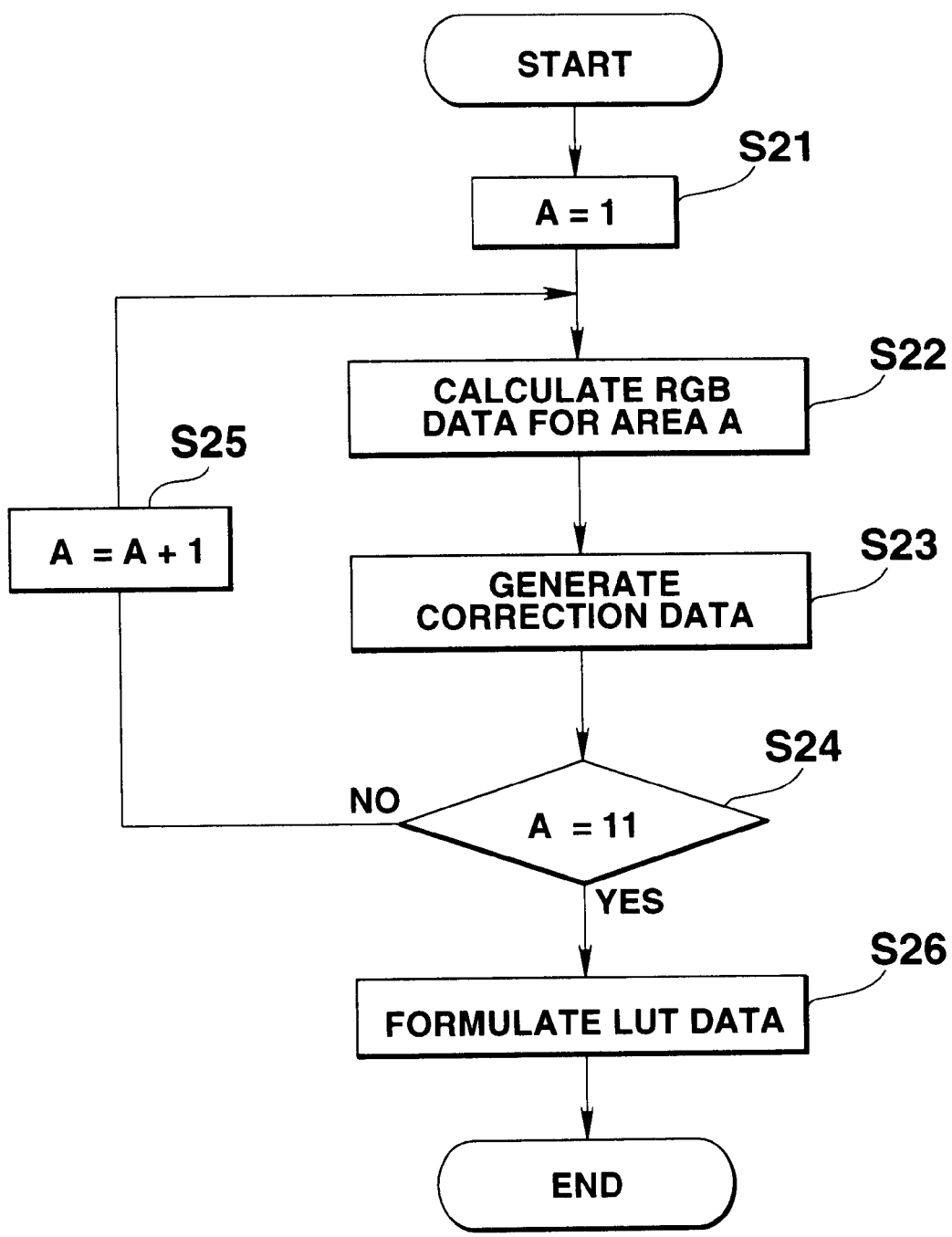
FIG. 9 is a flowchart showing the sequence of automatic adjustment of color balance in the imaging system of FIG. 2.

The processing for automatic grey balance adjustment at step S13 takes place in case of imaging a standard object which gives the grey scale comprised of 11 areas exhibiting gradual transition from black to white, as displayed on the display portion 71 shown in FIG. 6. Specifically, the processing occurs in accordance with the flowchart shown in FIG. 9.

The black area and the white area in the grey scale are denoted by area numbers A=1 and A=11, with the intermediate grey areas being denoted as A=2 to 10.

At the first step S21, an area number is initialized (A=1) and, at the second step S22, G–R and G–B are calculated, based on the color imaging data R, G and B of an area denoted by area number A. At the next step S23, correction data is found, based on the results of the calculations. The correction data is stored in association with the area number A. Such association with the area number A is equivalent to association with the signal level values of the color imaging signals R, G and B.

At the next step S24, it is judged whether or not the area number is equal to '11'. If A≠11, the information processing device 5 transfers to step S25 to increment the area number A (A=A+1). The information processing device 5 then reverts to step S22 to process the next area. The correction data is sequentially found for each of areas of the grey scale. If it is found at step S24 that A=11, the information processing device 5 reverts to step S26 to generate LUT table data. The information processing device 5 then transfers to step S16 in the flowchart of FIG. 8.

At step S26, the information processing device 5 sends a command for re-writing the LUT table data via SPC 63 to the CPU 69 of the digital processor 4. If fed with the above-mentioned table data via SPC 63 from the information processing device 5, the CPU 69 of the digital processor 4 routes the table data via buffer memory 65 to the LUTs 45R, 45G and 45B. The data in the table memories 452R, 452G and 452B in the LUTs 45R, 45G and 45B are re-written, based on the data supplied from the buffer memory 65, to implement optimum color balance adjustment.

If decision at step S12 is for 'manual', the information processing device 5 awaits instructions at step S14 as to the correction point and is actuated on user actuation.

At steps S14 and S15, grey balance is adjusted based on an image displayed on the display unit 71 shown in FIG. 7. First, at step S14, the user designates, using the mouse 5A or the like, an area in the displayed image on the display portion 71 in which to effect grey balance. The information processing device 5 generates color balance correction data based on an image of the designated area. The correction data is sent at step S16 from the information processing device 5 to the digital processor 4. The correction data is stored via buffer memory 65 in the LUTs 45R, 45G and 45B in association with the designated area, that is in association with the signal level of the image in the designated area.

Figure 10:
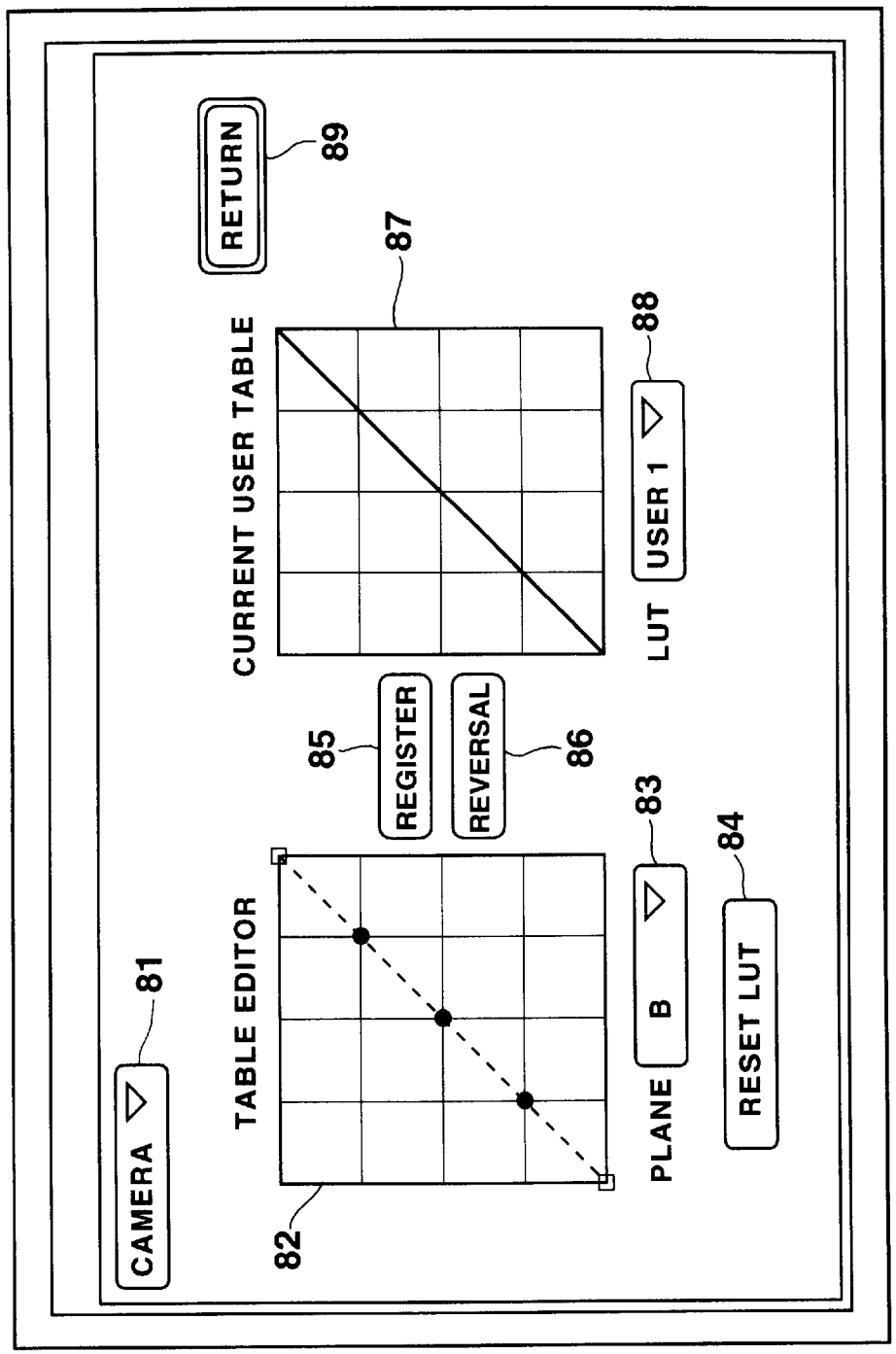
FIG. 10 illustrates the display contents of the display of the information processing apparatus shown in FIG. 6.

Referring to FIG. 10, there can be displayed, on the display 5A of the information processing device 5, a camera/monitor selection unit 81 for selecting which of the LUT values on the camera or the LUT value on the monitor device 8 should be changed; a table editor portion 82 for displaying LUT data prior to adjustment as a graph; a color signal selection portion 83 for selecting which of the color imaging signals R, G and B should be used for the graph displayed on the table editor portion 82; a resetting portion 84 for resetting the data being adjusted for colors by the table editing portion 82; a registration portion 85 for registering the color-adjusted correction values; an inversion portion 86 of negative/positive inversion; a user table for displaying the current LUT data (pre-correction LUT data); a call-out portion 88 for calling out the past correction value registered by the user; and a return portion 89 for reversion to the original picture.

In this case, the user can drag two black points on the table editing portion 82 using a mouse for performing signal level adjustment of the color imaging data B displayed on the color signal selection portion 83. Thus the user can obtain color imaging data adjusted to the desired color balance as he or she views the display of the information processing device 5.

If the user clicks the inversion portion 8, the CPU 69 of the imaging device reverses the characteristics of the LUTs 45R, 45G and 45B and the LUTs 49R, 49G and 49B based on the control signal from the information processing device 5. That is, the CPU 69 can reverse the usual right upward sloping LUT characteristics shown in FIG. 12 into right downward sloping LUT characteristics shown in FIG. 13 for realizing negative-positive converted color imaging data.

The user then sets the color imaging data B, for example, to a desired value, and clicks the registration portion 85. This causes the information processing device 5 to send data of the thus set value to the digital processor 4. Since the data in the LUTs 45R, 45G and 45B are re-written, these LUTs can vary the levels of the color imaging data R, G and B supplied from the A/D converters 44R, 44G and 44B for realizing optimum color balance adjustment.

Thus it is possible with the present imaging system to make color balance adjustment even in a grey area intermediate between the black and the white which has not been possible with the conventional white balance adjustment.

Also, with the above-described imaging system, the color balance can be adjusted easily and simply by designating an optional point of a graph of the LUT characteristics displayed on the display of the information processing device and by modifying the designated point according to the taste of the user.

In addition, with the above-described imaging system, in which color imaging data to the monitor device can be corrected by the LUT, the color balance adjustment can be realized as a whole in consideration of color variation between the monitoring device and the display of the information processing device.

With the imaging system, in which a particular object can be pre-arranged for setting the pickup point, color balance adjustment can be automatically realized for the grey area from black to white.

With the present imaging system, the following sequence may be used for adjusting the table data controlling the level of the color imaging data responsive to the color imaging signals. The table data are generated by the grey balance adjustment now explained.

The grey balance adjustment is performed in accordance with the flowchart shown in FIGS. 14 to 16.

First, the user prepares a white paper sheet at step S31, as shown in FIG. 14. At step S32, the user opens the diaphragm in order to permit the grey balance adjustment to be started at step S33. The processing for grey balance adjustment is executed by the CPU 30 of the camera head 3 and the CPU 69 of the digital processor 4.

In the grey balance adjustment, the white level is set to a pre-set luminance level at step S41 in the flowchart of FIG. 15. The white level setting is performed in accordance with the flowchart shown in FIG. 16.

That is, at step S32, the diaphragm is opened. Then, at step S51, it is checked whether or not the grey balance switch 9D is pressed. If the grey balance switch 9D is pressed, processing transfers to the next step S52.

In the steps S52 to step S55, the imaging output of the white paper sheet is adjusted to a pre-set luminance level by changing one of the gain of the control circuit 24, diaphragm of the imaging lens 2, or the signal charge accumulation time of the CCD image sensor 21, that is an electronic shutter.

The pre-set luminance level is set so that, if the signal level of the color imaging signals R, G and B for the white paper sheet with the diaphragm opened can be divided into 256 gradations, and the signal level of the green-colored imaging signal G corresponds to the 256th gradation, the green imaging data G outputted by the gain control circuit 24 corresponds to the 210th gradation.

That is, the white paper sheet is imaged by the camera head 3 with the diaphragm opened. An imaging output of the CCD image sensor 21 of the camera head 3 is supplied via pre-amplification circuit 23 to the gain control circuit 24. An output of the gain control circuit 24, that is green imaging data G, is supplied as a luminance level to the CPU 30.

At step S52, the CPU 30 checks if the luminance level of the imaging output of the white paper sheet is smaller than a pre-set luminance level. If the luminance level is smaller than the pre-set luminance level, the CPU 30 transfers to step S53 to increase the gain of the gain control circuit 24 in order to increase the luminance level. The CPU 30 then reverts to step S52 in order to check the luminance level of the imaging output repeatedly.

If it is found at step S54 that the luminance level of the imaging output is not smaller than the pre-set luminance level, the CPU 30 transfers to step S54. If the luminance level of the imaging output is larger than the pre-set luminance level, the CPU 30 transfers to step S55 in order to control the diaphragm of the imaging lens 2 or the signal charge accumulation time of the CCD image sensor 21, that is the electronic shutter, for decreasing the luminance level. The CPU 30 then reverts to step S52 in order to check the luminance level of the imaging output repeatedly.

The above-mentioned control of the electronic shutter is performed by the CPU 30 changing the signal charge accumulation time of the CCD image sensor 21 via timing generator 34 and CCD driver 35.

If the white level is set at step S41 in the flowchart of FIG. 15 to a pre-set luminance level, the CPU 30 of the camera head 3 transfers to step S42 to instruct the digital processor 4 to capture the imaging data R, G and B into the frame memory 56. The imaging data R, G and B, once captured by the frame memory 56, are read from the frame memory 56 so as to be captured by the information processing device 5.

At step S43, color balance correction data is formulated by the information processing device 5. Such correction amounts R' and B', that will give R=G=B based on imaging color data G of the color imaging data R, G and B, are calculated. R' and B' are found from R'=R−G and B'=B−G, respectively. Based on the calculated correction amount data R' and B' and the color imaging data R, G and B, table data in the table memories 452R, 452G and 452B in the LUTs 45R, 45G and 45B are re-written at step S44 by the CPU 69 of the digital processor 4.

That is, if the correction data R' and B are fed from the information processing device 5 to the SPC 63, the CPU 69 of the digital processor 4 writes table data in the table memories 452R, 452G and 452B in the LUTs 45R, 45G and 45B via buffer memories 65.

At step S45, it is checked whether or not the color imaging data R, G and B captured by the information processing device 5 via frame memory 56 are of the black luminance level. If the color imaging data are judged at this step S45 not to be of the black luminance level, processing transfers to step S46 in order to control the light exposure volume. At this step S46, a command is sent from the information processing device 5 to the CPU 30 of the camera head 3 in order for the CPU 30 to control the charge accumulation time of the CCD image sensor 21 or the light stop value of the imaging lens 2. For light exposure volume control, a system of controlling the signal charge accumulation time under constant light stop value or a system of controlling the light stop under constant signal charge accumulation time may be selectively used such that the light exposure volume control as selected by the user is executed by the system.

In the light exposure volume control under constant light stop, the signal charge accumulation time of the CCD image sensor 21 is varied for lowering the effective light exposure volume. In the light exposure volume control under constant signal charge accumulation time of the electronic shutter, the light stop value of the imaging lens 2 is changed for lowering the light exposure volume at the time of imaging.

After lowering the light exposure volume, processing transfers to step S43 again for calculating the correction amounts R' and B' based on the color imaging data R, G and B. The color imaging data R, G and B and the correction amounts R' and B' are written at step S44 from the information processing device 5 via buffer memory 69 in the table memories 452R, 452G and 451B of the LUTs 45R, 45G and 45B.

The processing from step S41 to step S46 in the flowchart of FIG. 15 is continued until the luminance level reaches the black level at step S45. This gives adjustment data for each grey level. When the luminance level reaches the black level, table data formulation by grey balance adjustment at step S33 shown in FIG. 14 comes to a close.

If the diaphragm or the signal charge accumulation time of the electronic shutter is controlled so as to be changed at a pre-set value, gradation control from the white level to the black level, executed in grey balance adjustment, can be changed continuously. This gives a desired number of samples from the white level to the black level.

With the table data, thus adjusted for grey balance, can be used for performing optimum color balance adjustment on subsequently inputted color imaging signals of the object, that is on color imaging data R, G and B supplied from the A/D converters 44R, 44G and 44B. In this manner, color-balance adjusted camera side color imaging data R, G and B are outputted via D/A converter.

In this manner, with the present imaging system, color balance adjustment can be achieved even in a grey area intermediate between the black and white, which has not been possible with the conventional white balance adjustment.

Also, with the imaging system, color balance can be adjusted easily and simply by designating an optional point of the image displayed on a display of the information processing device and by modifying the designated point depending on the liking of the user.

In addition, with the imaging system, color balance adjustment in the grey area from black to white can be achieved automatically by arranging a specified object for setting a pickup point.

What is claimed is:

1. A color imaging apparatus comprising:

imaging means for imaging, in an adjustment mode, an object having different predetermined grey levels from one pre-set region to another;

pre-set area extraction means for sequentially extracting color imaging signals of a plurality of pre-set areas in a picture of said imaged object, each of said pre-set areas corresponding to a different one of said pre-set regions of said object having a distinct grey level, each color imaging signal comprising a plurality of color signals;

level balance control data generating means for generating level balance control data, for each of said pre-set areas, based on a relationship between signal levels of the color signals contained in each of said pre-set areas, respectively;

storage means for storing said level balance control data in a plurality of look-up tables, with each look-up table provided for a different color corresponding to one of said color signals, and each look-up table having a level balance control data entry for its color for each of said grey levels;

display means for displaying a graph of said level balance control data of at least one of said look-up tables;

adjustment means for adjusting, responsive to a user input, said graph of level balance control data;

registration means for registering adjusted level balance control data in the at least one look up table in accordance with said adjusting; and a level balance control section;

wherein in an imaging mode, said imaging means is operable to capture an image to generate a plurality of image-mode color signals, and said level balance control section reads out level balance control data from said look-up tables, based on the signal levels of the image-mode color signals, to thereby adjust the levels of said color signals to grey balance the captured image.

2. A color imaging method comprising the steps of:

imaging, in an adjustment mode, an object having different predetermined grey levels from one pre-set region to another;

sequentially extracting color imaging signals of a plurality of pre-set areas in a picture of said imaged object, each of said pre-set areas corresponding to a different one of said pre-set regions of said object having a distinct grey level, each color imaging signal comprising a plurality of color signals;

generating level balance control data, for each of said pre-set areas, based on a relationship between signal levels of the color signals contained in each of said pre-set areas, respectively;

storing said level balance control data in a plurality of look-up tables, with each look-up table provide for a different color corresponding to one of said color signals, and each look-up table having a level balance control data entry for its color for each of said grey levels;

displaying a graph of said level balance control data of at least one of said look-up tables;

adjusting, responsive to a user input, said graph of level balance control data;

registering adjusted level balance control data in the at least one look up table in accordance with said adjusting; and in an imaging mode, capturing an image to generate a plurality of image-mode color signals, reading out level balance control data from said look-up tables, based on the signal levels of the image-mode color signals, and outputting adjusted color signals in accordance with said read-out level balance control data, thereby grey balancing the captured image.

* * * * *